United States Patent [19]
von Herrmann

[11] Patent Number: 5,351,932
[45] Date of Patent: Oct. 4, 1994

[54] CONTROL SYSTEM FOR A FLEXIBLE FLUID CARRYING HOSE

[75] Inventor: Pieter J. von Herrmann, Shaker Heights, Ohio

[73] Assignee: Cleveland State University, Cleveland, Ohio

[21] Appl. No.: 123,923

[22] Filed: Sep. 20, 1993

[51] Int. Cl.⁵ .................................................. F16K 7/02
[52] U.S. Cl. ............................................. 251/4; 251/8
[58] Field of Search ................................. 251/4, 7, 8

[56] References Cited
U.S. PATENT DOCUMENTS

| 662,955 | 12/1900 | McClelland | 251/4 |
| 2,212,733 | 8/1940 | Grigsby | 251/8 |
| 5,232,193 | 8/1993 | Skakoon | 251/4 |

Primary Examiner—John C. Fox
Attorney, Agent, or Firm—John F. McDevitt

[57] ABSTRACT

A control system is disclosed for use on flexible fluid carrying hoses, such as a fire hose, which now employ clamping means to temporarily interrupt fluid flow during hose operation. Frictional engagement means are provided for use with the hose clamp means to limit clamp movement when both opened and closed. A method of operating such hose clamp assembly is also disclosed.

11 Claims, 1 Drawing Sheet

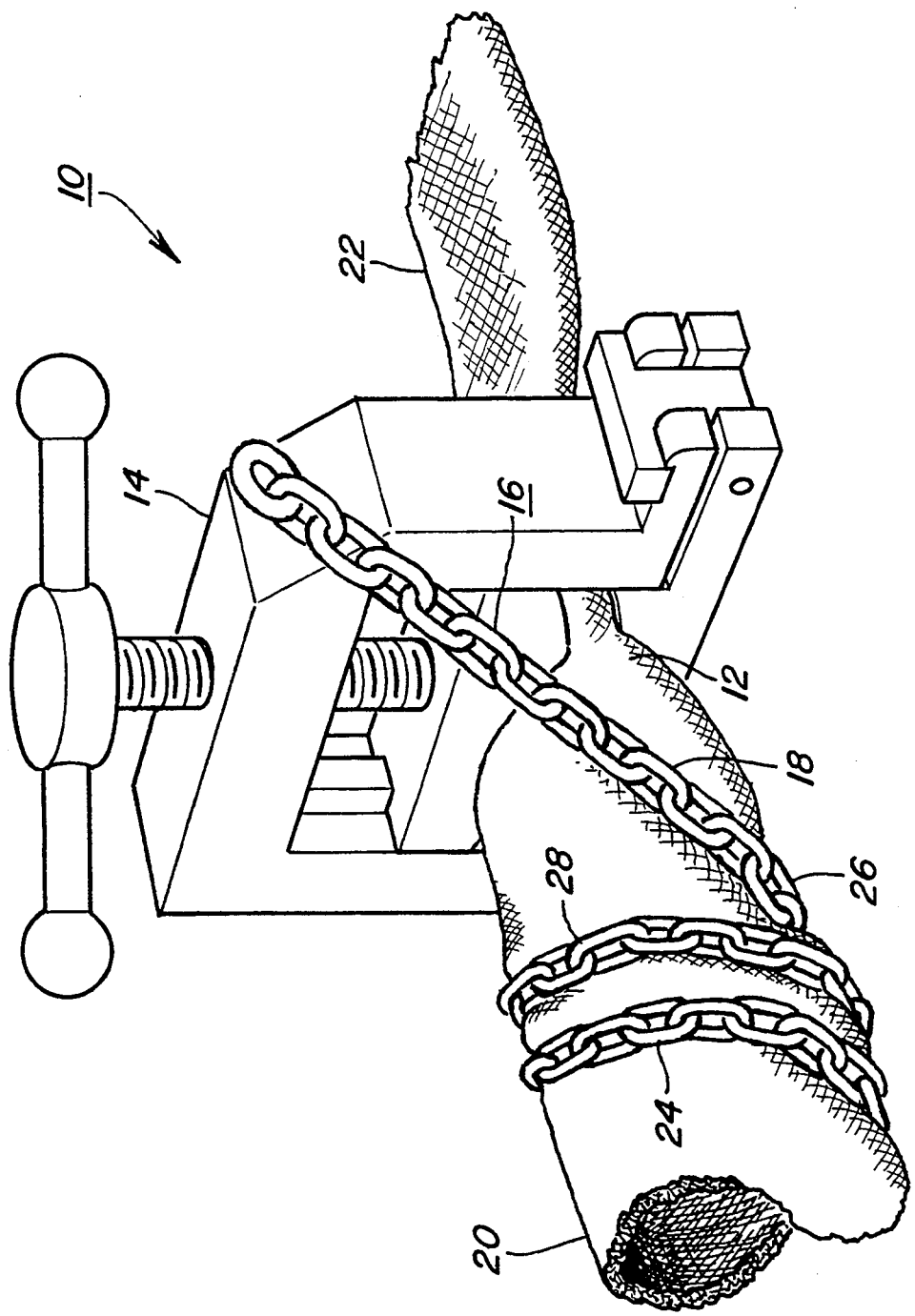

CONTROL SYSTEM FOR A FLEXIBLE FLUID CARRYING HOSE

BACKGROUND OF THE INVENTION

This invention relates generally to improved control means for use on flexible fluid carrying hoses, and more particularly to a novel clamping means whereby both opening and closing of said clamping means can be more effectively controlled during hose operation.

The development and use of various clamping devices to control fluid flow in flexible hoses particularly adapted for use in the fire fighting industry is known. It is often desirable to restrict fluid flow in fire hoses that have been inflated with fluid during the course of fighting a fire. For example, in U.S. Pat. No. 4,978,100 there is disclosed a screw-operated hose clamp designed to completely cut off water flow even when relatively high water pressures, e.g. 250 psi dynamic pressure, are present. The clamp means disclosed therein is in the form of a U-shaped guide structure that completely surrounds the outer surface of the subject hose portion even when the clamp pressure has been released. The clamp means is separated from the hose by unhinging the leg of the U-shaped guide structure to which a stationary jaw is attached. Opening this hinged leg opens a pathway for removal or insertion of a hose.

Temporarily cutting off the fluid flow by engaging a clamp enables the hose sections on the fluid supply side of the clamp to remain filled with fluid. The discharge nozzle at the exit end of the subject hose section can then be disengaged, an additional length of hose can be added, the discharge nozzle can be re-engaged at the exit end of the new hose section, and the hose system quickly recharged by disengaging the clamp.

In another U.S. Pat. No. 4,582,292 there is disclosed a different kind of clamp for use on flexible fire hoses for the purpose of restricting fluid flow therein, whereby the jaws of the clamp are actuated by means of a lever. This prior art clamp features beveled and grooved jaws said to reduce the problem of the hose popping out of the clamp when the clamp is opened. A series of grooves within the lower jaw face that contacts the hose is said to channel the initial surge of fluid generally through the center of the hose upon releasing the clamp, thereby reducing the chance of the hose popping out from between the jaws. Moreover, a flared configuration on the upper jaw face that contacts the hose is said to maintain the hose wedged between the jaws until the jaws are fully opened and normal water flow through the hose is reestablished.

Operation of a flexible hose system in the above described manner occasions clamp movement both upon opening and closing of the particular clamping device being employed. Such clamping device experiences forward movement from the high pressure supply side of the hose toward its lower pressure discharge side at these times. Such movement of the clamp device along the hose can be quite rapid and prevents proper operation of the clamp device. It becomes desirable, therefore, to reduce all such movement when the flow-restricting clamp means are being employed and to do so in a simple and cost effective manner.

It is therefore an object of the present invention to provide a means retarding further movement of said flow restricting type clamping means when being operated with a flexible hose.

It is a still further object of the present invention is to provide frictional engagement means for use in combination with flow-restricting type clamping devices and thereby more effectively regulate clamp operation with a flexible hose.

Still another important object of the present invention is to provide a novel method for operation of a flexible hose with flow-restricting type clamping means.

These and other objects as well as advantages of the present invention will become more apparent from the following description being provided upon the preferred embodiments.

SUMMARY OF THE INVENTION

It has now been discovered that a particular type frictional engagement means serves to limit physical movement of the flow-restricting clamping means now commonly being employed in flexible hose operation. More particularly, coupling of the present frictional engagement means to said clamping means thereafter limits physical movement of the clamping device in a unique manner when being closed as well as when being opened. Basically, the present frictional engagement means includes a flexible and extendible connecting portion which is secured at one end to the clamping device while having its other end physically engaging the supply side of the flexible hose with a gripping action. In one embodiment, the frictional engagement means consists simply of a rope or chain length connected at one end to the clamping device while having its free end looped in spiral segments around the hose exterior surface. The looped segments of such elongated connecting means become extended during opening and closing of the clamping device thereby providing a sufficient frictional force opposing clamp movement. In other embodiments, satisfactory frictional engagement means can be provided with flexible connection means again being secured to the clamping device at one end but with its free end being provided with some form of terminal gripping element, such as a loose-fitting bracket or yoke. By simply loosely attaching the gripping element of such multipart frictional engagement means to the hose exterior surface before opening or closing of the clamp device, the unattached flexible connection means will again become extended with forward clamp movement and thereafter provide the desired opposing frictional force. The frictional force halting clamp movement is provided by increased tilting engagement of the gripping element with the hose surface. It will also be apparent to those skilled in the art that still other type terminal gripping means can be secured to one end of the flexible connection means herein employed with comparable results. Accordingly, the preferred embodiment hereinafter described in detail is intended to be only illustrative and not limiting of the presently improved clamp assembly and its mode of operation.

BRIEF DESCRIPTION OF THE DRAWING

The accompanying drawing depicts a fire hose clamp assembly with the clamp means being opened while the present frictional engagement means is connected to the fire hose.

DETAILED DESCRIPTION OF THE PREFERRED EMBODIMENT

Referring to the accompanying drawing, there is depicted a perspective view of a representative clamp assembly 10 according to the present invention when being employed to interrupt fluid flow in a flexible hose member 12. Accordingly, the clamp assembly 10 consists of a screw-actuated clamp means 14 which has been directly connected to the depicted frictional engagement means 16 in a conventional manner. The rope or chain length 18 serving as said frictional engagement means in the illustrated embodiment has its other end simply looped around the hose member 12 for a flexible and extendable connection of said frictional engagement means to said hose member. As can also be seen in the present drawing, clamp means 14 is depicted in a closed position with Fluid under considerable pressure (not shown) maintaining supply side 20 of the hose member in a fully inflated condition while its discharge side 22 becomes deflated. Upon actuation of the clamp means in such manner during fluid flow through said hose member, the clamp means moves forward toward the discharge end of the hose member in response to the significant hydraulic forces which are present. Such clamp movement terminates, however, when the frictional forces produced from a sliding action of the now fully extended rope segments 24, 26 and 28 become equal to or greater than the existing hydraulic forces. A comparable result takes place in the illustrated embodiment upon opening of the clamp means 14 since there is again such forward clamp movement when the clamp is opened causing fluid flow to be restored in the hose member. Thus, a prior application of the illustrated frictional engagement means about the exterior surface of the hose member proves beneficial before initial use is made of the clamp means.

The above illustrated clamp assembly can be operated in a number of ways with respect to opening and closing of the clamp means. In one method of operation, the flexible and extendable connecting portion of the frictional engagement means is first loosely attached to the hose member while said hose member remains deflated. The clamp means of said clamp assembly which are connected to the frictional engagement means can remain unattached to the hose member at such time. Water is next admitted to the hose member under pressure causing fluid flow in the hose member. When fluid flow in the hose member is to be interrupted, the clamp means are attached thereto as depicted in the above described embodiment. Closing of the now attached clamp and frictional engagement interrupts fluid flow in the hose member with limited clamp movement. Correspondingly, a subsequent opening of the attached clamp and frictional engagement means to restore fluid flow in the hose member is accomplished with limited clamp movement. In a different mode of operation for interrupting and restoring fluid flow in a hose member already being supplied with fluid under pressure, the clamp means of the clamp assembly being illustrated can first be attached to the hose member at a location where said hose member is to be deflated. The frictional engagement means of said clamp assembly can then be attached to the hose member in the same manner hereinabove described. Closing of the attached clamp and frictional engagement means again interrupts fluid low with limited clamp movement while a subsequent opening of said clamp means to restore the fluid flow is likewise accompanied by limited clamp movement.

It will be apparent from the foregoing description that a broadly useful means has been provided to more effectively regulate fluid flow under considerable pressure in flexible hose systems of various type. It is also apparent that significant further modification can be made in the particular clamp assembly being employed without departing from the true spirit and scope of the present invention. For example, a lever-actuated clamp means could be substituted for the screw-operated clamp means herein illustrated, so long as the frictional engagement means connected thereto includes a flexible and extendable connecting portion such as the means illustrated herein. Moreover, the frictional engagement means can take alternate forms, so long as it provides frictional contact with the exterior surface of the hose means. Thus, having a gripping element secured to one end of the frictional engagement means such as also described herein is likewise contemplated. Consequently, it is intended to limit the present invention only by the scope of the appended claims.

What I claim as new and desire to secure by Letters Patent to the United States is:

1. A clamp assembly for a flexible hose member having an exterior surface which comprises:
   (a) hose clamp means to restrict fluid flow through the hose member with movable cooperating jaws of a clamp member when applied to the exterior surface of the hose member intermediate the supply end and the discharge end of said hose member,
   (b) frictional engagement means which limits movement of the clamp member by frictional force when the movable jaws of the clamp member are opened and closed, and
   (c) the frictional engagement means having a flexible and extendable connecting portion connected at one end to the clamp member while being adapted at the opposite end to be attached to the hose exterior surface.

2. The clamp assembly of claim 1 wherein the frictional force is applied with segments of the flexible and expendable connecting portion of the frictional engagement means.

3. The clamp assembly of claim 1 wherein the frictional engagement means comprises an elongated flexible member.

4. The clamp assembly of claim 1 wherein the flexible and extendable connecting portion of the frictional engagement means further includes a terminal gripping element.

5. The clamp assembly of claim 4 wherein the terminal gripping element has a bracket configuration.

6. The clamp assembly of claim 1 wherein the fluid flow is interrupted in the hose by the hose clamp means while retaining fluid pressure in the hose.

7. The clamp assembly of claim 1 wherein the frictional engagement means are applied to the exterior surface of the hose at a location closer to the supply end of the hose than the location where the clamp means are applied.

8. A method to operate a flexible hose member having an exterior surface with a clamp assembly attached thereto, the clamp assembly including clamp means to restrict fluid flow through the hose member with movable cooperating jaws of a clamp member when applied to the exterior surface of the hose member intermediate the supply end and the discharge end of said hose member, frictional engagement means which limits movement of the clamp member when the movable jaws of the clamp member are opened and closed, and the frictional engagement means having a flexible and extendable connecting portion connected to the clamp member at one end while being adapted at the opposite to be attached to the hose exterior surface, comprising the steps of:

(a) applying the clamp member to the exterior surface of the hose member with the jaws of the clamp member remaining open, (b) attaching the flexible and extendable connecting portion of the frictional engagement means to the exterior surface of the hose member, (c) causing fluid flow under pressure in the hose member, (d) interrupting fluid flow in the hose member by closing the jaws of the clamp member whereby the attached connecting portion of the frictional engagement means becomes extended to provide a sufficient frictional force opposing clamp movement, and (e) opening the jaws of the clamp member whereby further movement of the clamp member is restrained by the already extended connecting portion of the frictional engagement means.

9. The method of claim 8 wherein the frictional engagement means are attached at a location closer to the supply end of the hose than the location where the clamp means are attached.

10. The method of claim 8 wherein the frictional force is applied with segments of the flexible and extendable connecting means.

11. The method of claim 8 wherein the frictional engagement means comprises an elongated flexible member.

* * * * *